United States Patent [19]
Behr et al.

[11] Patent Number: 5,149,925
[45] Date of Patent: Sep. 22, 1992

[54] QUICK-RESPONSE ACCELEROMETER

[75] Inventors: Leonard W. Behr, Pontiac; Steven J. Anderson, Willis; Donald A. Duda, Novi; Robert B. Colten, Bloomfield Hills, all of Mich.

[73] Assignee: Automotive Systems Laboratory, Inc., Farmington Hills, Mich.

[21] Appl. No.: 577,485

[22] Filed: Sep. 5, 1990

[51] Int. Cl.⁵ .................................... G01D 15/135
[52] U.S. Cl. ..................... 200/61.45 M; 73/517 R; 200/61.53
[58] Field of Search .................. 73/514, 517 R; 200/61.45 M, 61.53

[56] References Cited

U.S. PATENT DOCUMENTS

| | | | |
|---|---|---|---|
| 3,100,292 | 8/1963 | Warner et al. | 73/517 R |
| 4,093,836 | 6/1978 | Ewy et al. | 200/61.53 |
| 4,827,091 | 5/1989 | Behr | 200/61.45 M |
| 4,873,401 | 10/1989 | Ireland | 200/61.45 M |
| 4,933,515 | 6/1990 | Behr et al. | 200/61.45 M |

*Primary Examiner*—John E. Chapman
*Attorney, Agent, or Firm*—Lyon & Delevie

[57] ABSTRACT

An acceleration sensor comprises a tube formed of an electrically-conductive, nonmagnetic material; an annular magnetically-permeable element, such as an iron washer, encircling a longitudinal portion of the tube; a magnetic sensing mass in the tube which magnetically interacts with the washer so as to be magnetically biased towards a first or "rest" position in the tube characterized in that a longitudinal portion of the sensing mass is situated within the portion of the tube encircled by the washer, the sensing mass being displaced from its rest position in the tube towards a second position therein in response to an accelerating force exceeding the magnetic bias thereon; and a switch operated by the sensing mass when the sensing mass is displaced to its second position in the tube. The instant accelerometer features a low threshold magnetic bias of the sensing mass to provide a quickened sensing mass response to acceleration inputs of short duration; and a magnetic bias which increases in a substantially linear manner with increasing sensing mass displacement from its rest position towards its second position within the tube.

5 Claims, 1 Drawing Sheet

QUICK-RESPONSE ACCELEROMETER

BACKGROUND OF THE INVENTION

The instant invention relates to acceleration sensors, or accelerometers, for sensing the acceleration experienced by an object, such as a motor vehicle.

The prior art teaches magnetically-biased accelerometers comprising a housing having an inertial or sensing mass within a cylindrical passage therein which is magnetically biased towards a first end of the passage. Such prior art accelerometers provide a maximum magnetic bias on the sensing mass when the sensing mass is in its "rest" position proximate the first end of the passage. When the housing is subjected to an accelerating force which exceeds this maximum or "threshold" magnetic bias, the sensing mass is displaced within the passage from its rest position therein towards a second position at the other end of the passage. Such displacement of the sensing mass may further be retarded as by using either gas or electromagnetic damping, as taught in U.S. Pat. No. 4,329,549 to Breed, and U.S. Pat. No. 4,827,091 to Behr, respectively. If the acceleration input is of sufficient amplitude and duration, the sensing mass is displaced to the second end of the passage, whereupon the sensing mass operates suitable switch means in the sensor, as by bridging a pair of electrical contacts projecting into the passage at the second end thereof.

Unfortunately, the threshold magnetic bias typically employed by such prior art magnetically-biased accelerometers, i.e., the magnetic bias on the sensing mass thereof when the sensing mass is in its rest position, is equivalent to between about 2 g's to about 8 g's of acceleration. Thus, in the event of a vehicle acceleration (deceleration) of relatively short duration, such as in a 30 mph frontal barrier crash, the high threshold magnetic bias on the sensing mass delays the motion thereof considerably, with the sensing mass ultimately requiring perhaps 20 ms to traverse the length of the passage to operate the switch means of the accelerometer.

SUMMARY OF THE INVENTION

It is the object of the instant invention to provide a magnetically-biased accelerometer featuring a quicker response to short-duration acceleration inputs than is available with known accelerometers.

A further object of the instant invention is to provide an accelerometer featuring a magnetically-biased and electromagnetically-damped sensing mass wherein the predominant force on the sensing mass as it begins to move from its rest position is provided by electromagnetic damping, with the magnetic bias on the sensing mass increasing with increasing displacement thereof so as to become the predominant force restraining further displacement of the sensing mass at a position within the passage short of its second position therein.

Yet another object of the instant invention is to provide an improved, magnetically-biased accelerometer wherein the magnetic bias exerted on the sensing mass thereof increases in a substantially linear manner with respect to its displacement from its rest position within the passage to its second position therein.

The improved accelerometer of the instant invention comprises a housing having a cylindrical passage formed therein; an annular magnetically-permeable element, such as an iron or steel washer, secured to the housing in concentricity with the passage so as to encircle a longitudinal portion thereof; and a cylindrical magnetic sensing mass located within the passage and magnetically-interacting with the washer so as to be magnetically biased towards a first position within the passage, the first position being characterized in that a longitudinal portion of the sensing mass is situated within the portion of the passage encircled by the washer, with the sensing mass being displaced from its first position within the passage towards a second position therein in response to an accelerating force exceeding the magnetic bias thereon.

The instant accelerometer further comprises switch means on the housing responsive to the sensing mass when the sensing mass moves to the second position within the passage. For example, in the preferred embodiment of the instant accelerometer, the switch means comprises a pair of electrical contacts which project into the passage for engagement with an electrically-conductive surface of the sensing mass upon displacement of the sensing mass to its second position within the passage.

The instant accelerometer further includes damping means for retarding the displacement of the sensing mass within the passage. In the preferred embodiment, the damping means comprises an electrically-conductive, nonmagnetic ring or tube which encompasses the passage and magnetically interacts with the sensing mass upon the displacement thereof to provide electromagnetic damping therefor. In this regard, it is noted that the damping ring may encircle the portion of the housing defining the passage, or, as in the preferred embodiment, the inner surface of the damping ring may itself define a portion of the passage. The displacement of the sensing mass within the passage induces longitudinally-discrete electric currents in the damping ring which flow substantially circumferentially therein and which vary proportionally with the rate of sensing mass displacement relative thereto and the distance of the sensing mass therefrom. The electric current thus induced in each affected longitudinal portion of the damping ring in turn generates a magnetic field which interacts with the sensing mass to retard further displacement thereof.

In operation, the magnetic interaction between the sensing mass and the washer of the instant accelerometer generates a magnetic bias on the sensing mass which begins to increase as the sensing mass is displaced from its first or "rest" position within the annulus of the washer towards its second position against the switch contacts. Significantly, under the instant invention, the "threshold" magnetic bias on the sensing mass is only a fraction of 1 g, with the magnetic bias increasing as the sensing mass is displaced towards the switch contacts. Thus, when the housing experiences an acceleration input of relatively short duration, as might be encountered in the abovementioned 30 mph vehicle frontal barrier crash, this small threshold magnetic bias on the sensing mass will be overcome, and the sensing mass will rapidly begin to be displaced towards the switch contacts, with such initial displacement of the sensing mass being predominantly retarded by the electromagnetic damping force thereon. As the sensing mass is increasingly displaced from its rest position within the annulus of the washer, the magnetic bias on the sensing mass continues to build in strength so as to ultimately become the predominant restraining force on the sensing mass prior to its reaching the switch contacts. Most preferably, the magnetic strength of the sensing mass, the relative location of the rest position of the sensing mass inside the annulus of the washer, the dimensions and material of the washer, and the "stroke" of the passage, i.e., the distance from the rest position to the second position, are adjusted to obtain a magnetic bias on the sensing mass which increases in a substantially linear manner with increasing displacement of the sensing mass.

DETAILED DESCRIPTION OF THE PREFERRED EMBODIMENT OF THE INVENTION

Figure 1:
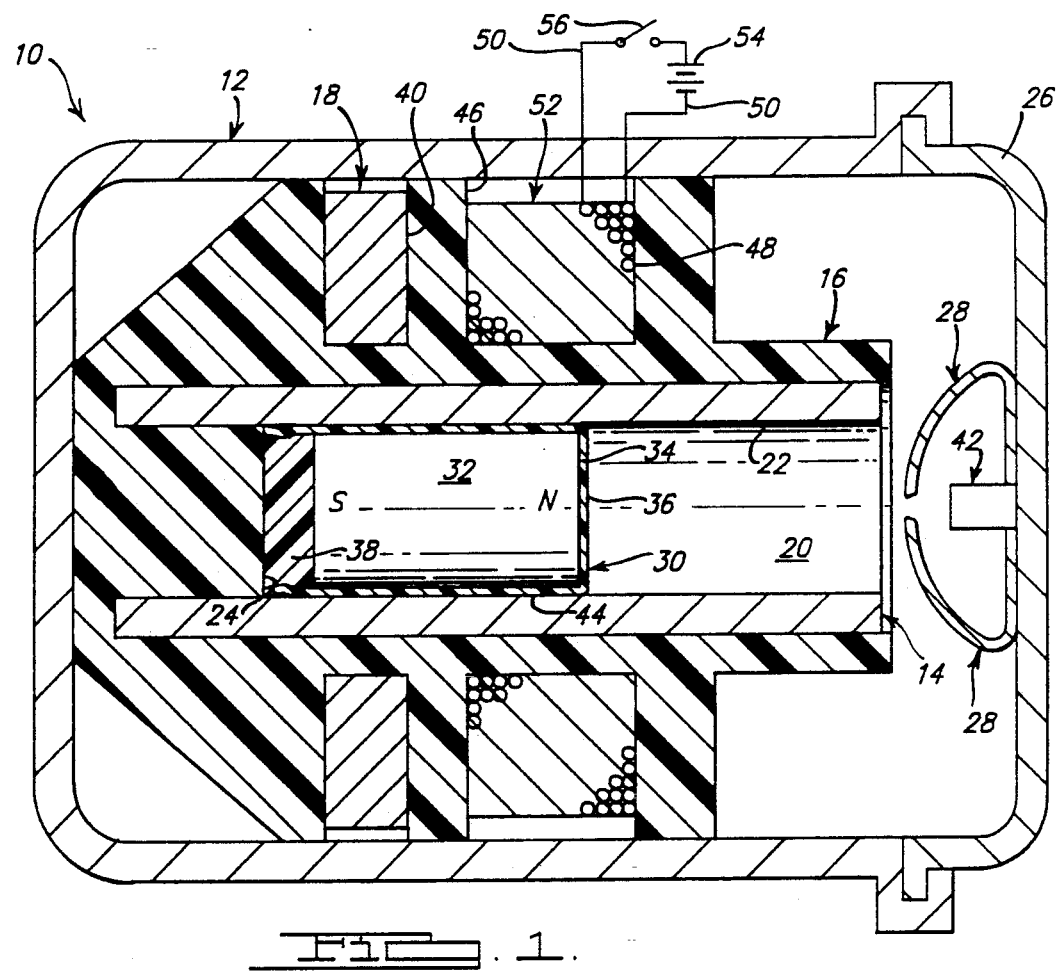
FIG. 1 is a longitudinal view in cross-section of an improved accelerometer constructed in accordance with the instant invention showing the magnetic sensing mass thereof in its first or "rest" position within the passage.

A vehicle accelerometer 10 constructed in accordance with the instant invention is illustrated in FIG. 1. An iron or steel housing 12 houses a tube 14 formed of an electrically-conductive, nonmagnetic material such as copper which is supported with respect thereto as by an encapsulating sleeve 16. The sleeve 16, which is preferably formed of an electrically-insulative material such as plastic and is conveniently molded about the tube 14, further supports an annular, magnetically-permeable element, such as an iron or steel washer 18, which encircles a longitudinal portion of the tube 14. It is noted that, in the preferred embodiment, the washer 18 is placed proximate to, but electrically isolated from, the copper tube 14 to prevent galvanic corrosion.

A right circular cylindrical passage 20 is thus defined within the housing 12 by the inner surface 22 of the tube 14. The first end 24 of the passage 20 is in turn defined by a stationary stop which may conveniently comprise a portion of the molded plastic sleeve 16. Significantly, the first end 24 of the passage 20 is positioned relative to the washer 18 so as to provide a longitudinal portion of the passage 20 which is encircled by the washer 18.

A pair of electrical contacts 28 are mounted on the cap 26 so as to project across the open end of the tube 14. The housing 12 is preferably sealed upon attachment of the cap 26 thereto during final assembly as by interlocking peripheral flanges thereon, respectively, in order to prevent the infiltration of moisture and other contaminants thereinto.

A magnetic sensing mass 30 in the tube 14 comprises a substantially cylindrical permanent magnet 32 formed of a material, such as samarium-cobalt, capable of providing a relatively high flux density which remains relatively unaffected by changes in temperature over the desired operating range of the instant accelerometer 10. In order to accommodate the frangible nature of many such high-strength magnets, the magnet 32 may be encapsulated in an enveloping structure comprising, for example, an extruded cup 34 formed of a nonmagnetic material such as copper or brass, the thickness of which has been exaggerated in FIG. 1 to facilitate the illustration thereof. Most conveniently, the open end of the thinwalled cup 34 is initially plugged with plastic cap 38 and then circumferentially crimped to securely encapsulate the magnet 32. The bottom surface 36 of the cup 34 is preferably gold-plated for improved electrical conductivity and greater corrosion resistance.

The tube 14 also provides electromagnetic damping for the sensing mass 30 which varies in proportion to the rate of such displacement of the sensing mass 30. More specifically, the movement of the sensing mass 30 within the tube 14 induces circumferential currents therein which, in turn, generates a magnetic field which opposes further displacement of the sensing mass 30.

In operation, the sensing mass 30 magnetically interacts with the washer 18 so as to be magnetically biased towards a first position within the passage 20 against the first end 24 thereof, as shown in FIG. 1. Significantly, when the sensing mass 30 occupies its first or "rest" position within the passage 20, a longitudinal portion of the sensing mass 30 is situated within the longitudinal portion of the passage encircled by the washer 18, i.e., a longitudinal portion of the sensing mass 30 passes within the plane defined by the face 40 of the washer 18 so as to be at least partially encircled thereby.

Upon experiencing an accelerating force exceeding the threshold magnetic bias thereon, the sensing mass 30 begins to move from its rest position in the passage 20 towards a second position therein proximate to the open end of the tube 14. Specifically, the second position of the sensing mass 30 within the passage 20 is the position therein which results in the engagement of the gold-plated surface 36 of the sensing mass with the contacts 28, whereby the contacts 28 are electrically bridged by the sensing mass 30. A second stop 42 prevents the escape of the sensing mass 30 from the tube 14 and prevents deleterious over-flexing of the contacts 28 when the sensor is subjected to an extreme acceleration, or during a test of the sensor in the manner described hereinbelow.

Figure 2:
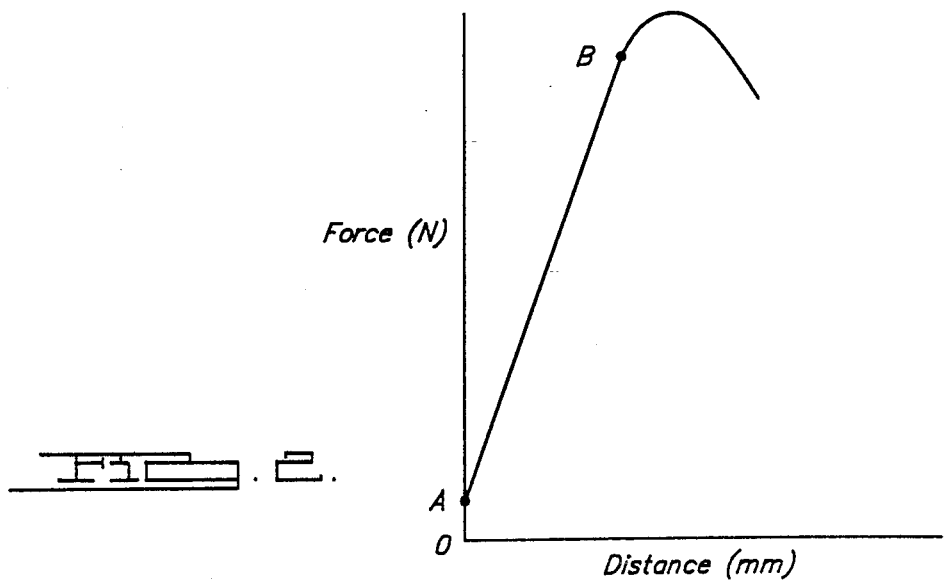
FIG. 2 is a plot of the magnetic biasing force on the sensing mass of the accelerometer of FIG. 1 as it travels from its rest position towards its second position within the passage.

FIG. 2 shows the magnetic bias on the sensing mass 30 as it travels from its rest position, represented by point A in FIG. 2, to its second position within the passage 20, represented by point B of FIG. 2. Specifically, the magnetic bias on the sensing mass 30 increases in a substantially linear manner as the sensing mass 30 is displaced from its rest position towards its second position within the passage 20. Thus, while the initial magnetic bias on the sensing mass 30 is relatively low to allow the sensing mass 30 to respond almost immediately to any acceleration input to the housing 12, whereby the movement of the sensing mass 30 within the passage 20 is initially predominantly restrained by the electromagnetic damping effect discussed hereinabove, the strength of the magnetic bias continues to build so as to ultimately become the predominant restraining force on the sensing mass 30 prior to its reaching its second position within the passage 20. Preferably, the inner surface 22 of the tube 14 or the radially-outer surface 44 of the sensing mass 30 is teflon-coated to reduce the sliding friction therebetween.

A circumferential groove 46 in the molded plastic sleeve 16 provides a coil form about which an electrically-conductive wire 48 is wound. A pair of lead wires 50 extends through the housing 12 to facilitate the connection of the coil 52 with a battery 54 via a switch 56, as illustrated schematically in FIG. 1. The operability of the accelerometer 10 is tested by delivering a unidirectional current pulse through the coil 52. The resulting magnetic field magnetizes the washer 18, which in turn repels the sensing mass 30 to the second position within the passage 20. Upon reaching the second position, the electrically-conductive surface 36 of the sensing mass bridges the contacts 28, whereby full sensor function is confirmed.

It is noted that the sensor housing 12 and cap 26 are formed of iron or steel in order to isolate the sensing mass 30 from external electromagnetic fields and materials. And, while the housing may magnetically interact with the sensing mass so as to force it into engagement with the inner surface 22 of the tube 14, such engagement may nonetheless be preferable to the unpredictable effects on sensor response due to such external magnetic fields and materials. Moreover, the housing 12 may be asymmetrically positioned about the tube 14 so that the magnetic interaction between the housing 12 and the sensing mass 30 therein tends to counter the force of gravity on the latter, whereby the engagement between the sensing mass 30 and inner surface 22 of the tube 14 due to gravity is also minimized.

While the preferred embodiment of the invention has been disclosed, it should be appreciated that the invention is susceptible of modification without departing from the spirit of the invention or the scope of the subjoined claims.

I claim:

1. An accelerometer comprising:
   a housing having a cylindrical passage formed therein;
   an annular magnetically-permeable element secured to said housing so as to encircle a first longitudinal portion of the passage;
   a cylindrical magnetic sensing mass located within the passage, said sensing mass magnetically-interacting with said element so as to be magnetically biased towards a first position within the passage, said first position being characterized in that a longitudinal portion of said sensing mass is situated within said first portion of the passage, said sensing mass being displaced from said first portion towards a second position within the passage in response to an accelerating force exceeding said magnetic bias;
   damping means for retarding the displacement of said sensing mass within the passage; and
   switch means on the housing responsive to the sensing mass when the sensing mass is displaced to said second position within the passage,
   wherein said damping means comprises an electrically-conductive, nonmagnetic ring encompassing the passage, the displacement of said sensing mass within the passage including an electric current in said ring, said electric current in said ring generating a magnetic field opposing further displacement of said sensing mass.

2. In an accelerometer including:
   a housing having a cylindrical passage formed therein;
   a magnetically-permeable element secured to said housing proximate to the passage;
   a magnetic sensing mass located within the passage, said sensing mass being magnetically-biased towards said element so as to remain in a first position within the passage proximate to said element until said magnetic bias is overcome by acceleration of said housing, whereupon said sensing mass is displaced in response to such acceleration towards a second position within the passage, said magnetic bias being sufficient to return said sensing mass to said first position from any other position within the passage short of said second position;
   damping means for retarding the displacement of said sensing mass within the passage; and
   switch means on the housing responsive to said sensing mass when the sensing mass is displaced to said second position, the improvement wherein:
   said element encircles a first longitudinal portion of the passage, and said first position of said sensing mass within the passage is characterized in that a longitudinal portion of said sensing mass is situated within said first portion of the passage,
   wherein said damping means comprises an electrically-conductive, nonmagnetic ring encompassing the passage, the displacement of said sensing mass within the passage including an electric current in said ring, said electric current in said ring generating a magnetic field opposing further displacement of said sensing mass.

3. An accelerometer comprising:
   an electrically-conductive, nonmagnetic tube;
   an annular, magnetically-permeable element encircling a longitudinal portion of said tube;
   a cylindrical magnetic sensing mass in said tube, said sensing mass magnetically-interacting with said element so as to be magnetically biased towards a first position in said tube, said first position being characterized in that a longitudinal portion of said sensing mass is situated in said portion of said tube encircled by said element, said sensing mass being displaced towards a second position in said tube in response to an accelerating force exceeding said magnetic bias, the displacement of said sensing mass in said tube inducing an electric current to flow circumferentially in said tube, said electric current in said tube generating a magnetic field opposing further displacement of said sensing mass; and
   switch means responsive to said sensing mass when said sensing mass is displaced to said second position in said tube.

4. The accelerometer of claim 3, wherein said element is concentric with said tube.

5. The accelerometer of claim 3, wherein said magnetic bias increases in a substantially linear manner with increasing displacement of said sensing mass from said first position to said second position.

* * * * *

UNITED STATES PATENT AND TRADEMARK OFFICE
CERTIFICATE OF CORRECTION

PATENT NO. : 5,149,925

DATED : September 22, 1992

INVENTOR(S) : Leonard W. Behr et al

It is certified that error appears in the above-identified patent and that said Letters Patent is hereby corrected as shown below:

Col. 5, line 49, Claim 1, "including" should be --inducing--.
Col. 6, line 25, Claim 2, "including" should be --inducing--.

Signed and Sealed this

Twelfth Day of October, 1993

*Attest:*

BRUCE LEHMAN

*Attesting Officer*     *Commissioner of Patents and Trademarks*